(12) United States Patent
Windorfer

(10) Patent No.: US 11,974,715 B2
(45) Date of Patent: May 7, 2024

(54) SELF-PROPELLED FLOOR PROCESSING DEVICE

(71) Applicant: Vorwerk & Co. Interholding GmbH, Wuppertal (DE)

(72) Inventor: Harald Windorfer, Mettmann (DE)

(73) Assignee: Vorwerk & Co. Interholding GmbH, Wuppertal (DE)

( * ) Notice: Subject to any disclaimer, the term of this patent is extended or adjusted under 35 U.S.C. 154(b) by 327 days.

(21) Appl. No.: 17/518,633

(22) Filed: Nov. 4, 2021

(65) Prior Publication Data

US 2022/0142426 A1    May 12, 2022

(30) Foreign Application Priority Data

Nov. 9, 2020 (DE) ...................... 10 2020 129 411.5

(51) Int. Cl.
*A47L 9/28* (2006.01)
*G01C 21/00* (2006.01)
*G05D 1/00* (2006.01)

(52) U.S. Cl.
CPC ........... *A47L 9/2894* (2013.01); *A47L 9/2805* (2013.01); *G01C 21/383* (2020.08); *G05D 1/0274* (2013.01); *A47L 2201/04* (2013.01)

(58) Field of Classification Search
CPC .. A47L 9/2894; A47L 9/2805; A47L 2201/04; G01C 21/383; G05D 1/0274; G05D 2201/0215
See application file for complete search history.

(56) References Cited

U.S. PATENT DOCUMENTS

2015/0094879 A1 * 4/2015 Pari ..................... B25J 11/008
                                                                701/2
2020/0383549 A1 * 12/2020 Weigel ............... A47L 11/4061

* cited by examiner

*Primary Examiner* — Michael D Lang
(74) *Attorney, Agent, or Firm* — Collard & Roe, P.C.

(57) ABSTRACT

A self-propelled floor processing device has a drive unit for moving the floor processing device within an environment, a communication interface for outputting information to a user of the floor processing device, an obstacle detection unit for detecting obstacles within the environment and a computing device, which is set up to generate an area map based upon the obstacles detected by the obstacle detection unit, localize the floor processing device using the area map, and transmit control commands to the drive unit and the communication interface. The computing device defines at least one obstacle within the area map that cannot be independently overcome by the floor processing device as a transition obstacle, identifies the transition obstacle based upon a comparison of currently detected obstacles with the transition obstacle stored in the area map, and reports a manual transport requirement to the user upon reaching the transition obstacle.

8 Claims, 2 Drawing Sheets

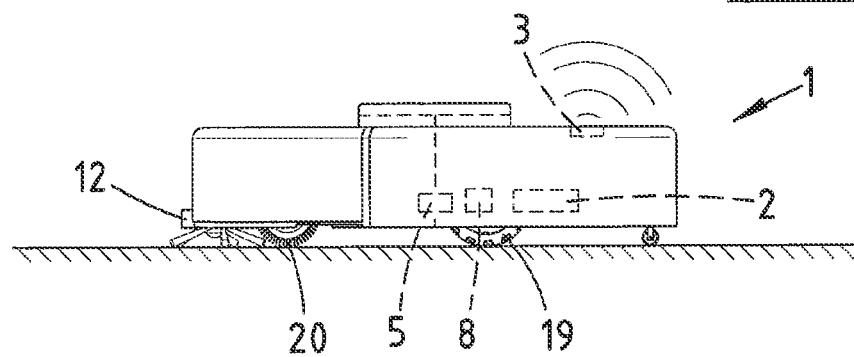
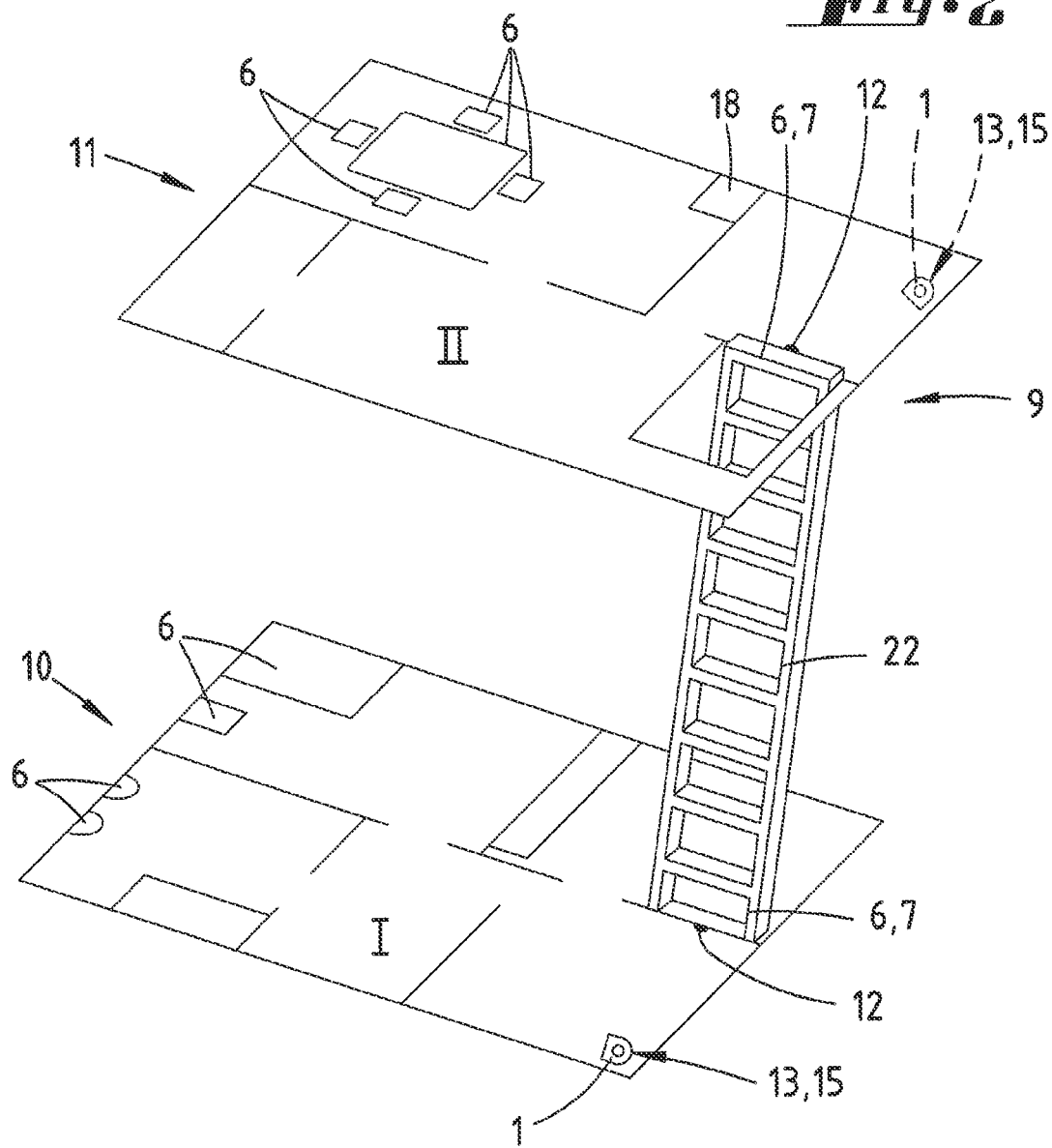

SELF-PROPELLED FLOOR PROCESSING DEVICE

CROSS REFERENCE TO RELATED APPLICATIONS

Applicant claims priority under 35 U.S.C. § 119 of German Application No. 10 2020 129 411.5 filed Nov. 9, 2020, the disclosure of which is incorporated by reference.

BACKGROUND OF THE INVENTION

1. Field of the Invention

The invention relates to a self-propelled floor processing device with a drive unit for moving the floor processing device within an environment, a communication interface for outputting information to a user of the floor processing device, an obstacle detection unit for detecting obstacles within the environment and a computing device, which is set up to generate an area map based upon the obstacles detected by the obstacle detection unit, localize the floor processing device using the area map, and transmit control commands to the drive unit and the communication interface.

2. Description of the Related Art

Self-propelled floor processing devices that localize and navigate themselves in the environment using a most often self-generated area map are sufficiently known in prior art. For example, the floor processing devices can involve household or even industrially or commercially used cleaning devices, polishing devices, grinding devices and others. Cleaning devices can here in particular be vacuum cleaners, mopping devices or combined vacuuming-mopping devices. The self-propelled floor processing devices usually have an obstacle detection device, for example which can measure distances to obstacles in the environment. The detected distances can be used to generate the area map, which essentially contains a layout of the environment with room boundaries and obstacles located therein. The obstacles can involve the room boundaries themselves on the one hand, and on the other hand be items of furniture or also steps, platforms, landings, and the like, the location of which cannot be traversed by the floor processing device.

It is further known to plan one or several floor processing activities of the floor processing device chronologically in advance, wherein an action plan is generated containing information about at what time and/or at what locations in the environment the floor processing device is to perform a floor processing activity. As soon as a defined time has been reached, the floor processing device begins to move so as to perform the preplanned floor processing activity.

Even though such floor processing devices have proven themselves in prior art, the floor processing devices are currently still unable to overcome obstacles such as stairs, in order to switch to another floor of a building. For this reason, generated action plans relate solely to floor processing activities on the same floor. The user him or herself must see to it that several floors in the same building are sufficiently processed, in particular as concerns a uniform floor processing result over the entire surface of the building.

SUMMARY OF THE INVENTION

Proceeding from the aforementioned prior art, the object of the invention is to further develop a floor processing device in such a way that the processing of several floors of a building by only one floor processing device can be ensured, in particular in such a way that the floor processing result on different floors of the building is equally optimal.

In order to resolve this task, it is proposed that the computing device of the floor processing device be set up to define at least one obstacle within the area map that cannot be independently overcome by the floor processing device as a transition obstacle, identify the transition obstacle during a movement through the environment based upon a comparison of currently detected obstacles with the transition obstacle stored in the area map, and report a manual transport requirement to the user by means of the communication interface upon reaching the transition obstacle.

According to the invention, positions of so-called transition obstacles in the environment or area map are now noted which the obstacle detection unit of the floor processing device can detect as the floor processing device moves through the environment, specifically through a comparison with known transition obstacles stored in the area map. Once a transition obstacle has been reached, the floor processing device notifies a user of the floor processing device that the floor processing device would like to be transported to another locations, since it is unable to move to this location on its own. The aforementioned configuration is recommended in particular if the floor processing device moves along a predefined path of movement through the environment, until the defined transition obstacle is finally reached, which preferably comprises the end of the planned path of movement on a specific floor of a building. The computing device of the floor processing device can determine a transport requirement not only once a preplanned path of movement has been completely traversed, but alternatively or additionally also once a specific time has been reached, a specific period of time has elapsed or a specific location or partial area of the environment was completely processed or all floor processing activities to be performed have been completed. According to an especially simple embodiment, the floor processing device can report the transport requirement to the user purely based on its presence at the position of the transition obstacle. If the user then happens to pass the transition obstacle and sees the floor processing device there, he or she may become aware of the transport requirement and carry the floor processing device to a position known to him or here within the environment, in particular a location on another floor of the building. The new location can basically be freely selected by the user, provided the floor processing device is able to determine its own position at the new location and localize itself and move accordingly in an area map for this floor. However, it is especially preferable that the user have determined a defined transition location for parking the floor processing device on another floor beforehand, thereby making it easier to localize the floor processing device in the area map. Alternatively, it can also be provided that the floor processing device suggest a location at which the floor processing device is to be parked to the user with the reported transport requirement. The user can then follow this suggested location. Such transition locations can also have been defined by the user him or herself beforehand, so that the floor processing unit must only issue a notation such as "Please carry to the defined transition location". It is basically also possible that the user refuses a transport requirement communicated by the floor processing device. For example, the user can for this purpose initiate an entry on the floor processing device itself, in particular its communication interface of input device, such as a keyboard or a touchscreen, or also by means of an external terminal with a communications link with the communication interface of the floor processing device, for example a mobile phone or the like. If the user would temporarily not wish to utilize the transmission function of the floor processing device at all, he or she can also elect to deactivate this function of the floor processing device. The computing device of the floor processing device can detect a transport of the floor processing device to a new location, in particular to the defined transition location, in various ways. On the one hand, it is possible that a user report a transport of the floor processing device to a new location. For example, this can take place via an operating device of the floor processing device, e.g., a keyboard or a touchscreen. Alternatively, the user can employ an application installed on an external terminal. Alternatively, it is possible that the computing device of the floor processing device detect a base station at a new location of the environment, and thereby receive information as to the environmental area in which the processing device is located. In addition, the floor processing device can detect when the floor processing device is lifted from a surface, and likewise when the floor processing device is placed back down on a surface. For example, this can take place via a contact sensor, which detects that a contact between the floor processing device and floor surface was cancelled and restored. For example, such sensors are known as so-called "kidnap sensors". For example, an electrical contact can detect a displacement of a wheel suspension, which is initiated by lifting the floor processing device from the floor. If the floor processing device is put down again and the wheel is correspondingly again moved toward the device housing of the floor processing device, the computing device can infer placement at another location of the environment. Alternatively, a position sensor or accelerometer can be used to detect a transport process and its conclusion based upon the detected movement processes.

In particular, it is proposed that the area map of the floor processing device have several partial environmental areas that belong to different floor levels or elevation levels of a building, wherein the partial environmental areas are logically interconnected by defined transition points. Each defined transition point can in particular be part of a defined transition obstacle, so that the transition point locally coincides with the transition obstacle. However, it is basically also possible that the defined transition point be defined at a different location than the position of the transition obstacle itself. The user of the floor processing device preferably brings various levels of a building, which can be stories, platforms, or other different height levels, into a logical sequence relative to their absolute height over a reference plane, so that it is known which partial environmental areas, in particular floors or levels, are directly adjacent to each other. The partial area maps belonging to the partial environmental areas, in particular partial area layouts, can then be logically stacked relative to their height levels. Defined levels are direct neighbors and those spaced a larger distance apart from each other, for example a cellar and a first floor of a building, which can only be reached by passing through a first floor. If the floor processing device now wishes to switch to another level of the building, it travels to the defined transition point in the currently traversed level, and there—as already described—sends information, in particular a push message, an email or the like, to the user, preferably with the contents that the floor processing device wishes to be carried to a specific other level. Based on the message, or even alternatively solely based on the position where the floor processing device is located, the user can then infer the requested transition of the floor processing device. By logically linking a first transition point located in a first level of the building with a defined second transition point located in a second level of the building, the computing device of the floor processing device can put together the partial environmental areas of the area as though they were located on one and the same level. Even if the floor processing device is shifted from the first to the second level or vice versa, the computing device of the floor processing device always knows how the floor processing device is currently located and oriented in the environment. The floor processing device can otherwise navigate in the several partial environmental areas of the area map as only known in prior art for one level. The floor processing device overcomes the transition obstacle, which in particular can be a step or a staircase between various levels of the environment, via the manual intervention of the user.

It is further proposed that the output transport requirement contain a prompt to the user to carry the floor processing device to a defined transition location of the environment, wherein the communication interface is designed to output the transport requirement as a voice signal, a light signal, or as a communication to an external terminal of the user having a communications link with the communication interface of the floor processing device. The user can thus receive the message about the transport requirement in varying ways. For example, the floor processing device can have a loudspeaker that transmits a voice message to the user. A display can further be provided, on which the user receives a text message, image display or the like. Alternatively, light-emitting diodes or other optical display elements can be provided, which transmit coded information about the transport requirement to the user. In a special embodiment, the user can have a message displayed on an external terminal, for example a mobile phone, a tablet, a laptop, or the like. The floor processing device and the external device can exchange data and information via a shared data communication network, for example a WLAN or also the internet. In particular, it is recommended that an application for communicating with the floor processing device be installed on the external terminal of the user.

It is further proposed that the area map of the floor processing device define at least one wait position, at which the floor processing device waits for the user after the transport requirement was determined and a message sent to the user. The wait position can lie right next to the transition obstacle stored in the area map, or in particular be flush with the transition point, which produces a logical connection between two partial environmental areas of the area map. As soon as the computing device of the floor processing device has detected a transport requirement, it can actuate the wait position and/or remain standing in the latter, and then output the message to the user. The floor processing device waits at the wait position known to the user, so as to be converted by the user into another level of the environment. As a consequence, the floor processing device travels toward a defined connecting point between the partial environmental areas when a level change is pending.

In this conjunction, it is advantageously proposed that the computing device be designed to end a waiting by the floor processing device at the wait position if a time that exceeds a defined maximum timespan has elapsed since the wait began. The defined maximum timespan can preferably be defined by a user. Alternatively, however, the maximum timespan can also already be stored in a memory of the floor processing device by the manufacturer of the floor processing device. The maximum timespan determines the time for which the floor processing device remains at a transition location for the transmission, and waits for the user. As soon as this maximum timespan has been exceeded without the user becoming active, the floor processing device ends its waiting activity, for example assuming an inactive resting state, or turns to other floor processing activities on the same level of the environment. For example, the floor processing device can also return to a base station or charging station so as to be serviced there. The defined maximum timespan can preferably comprise wait times of between one and ten hours. This wait time corresponds to the times a user is usually absent, for example in a household area or an office environment. The wait activity of the floor processing device can additionally or alternatively also be limited by the fact that the accumulator of the floor processing device dips below a defined accumulator charging status. If the charging status drops below a defined limit during a wait activity, the floor processing device interrupts the wait activity, and preferably uses the residual capacity of the accumulator to return to a base station, for example, so as to there recharge the accumulator.

The obstacle detection device of the floor processing device can be designed to detect a presence of the user in the environment of the floor processing device and report it to the computing device, wherein the computing device is designed to thereupon report the manual transport requirement to the user. In this embodiment, the user is only notified about the transport requirement if the obstacle detection device has determined that a user is also actually present in the environment of the floor processing device at the moment. The environment of the floor processing device can here be defined in such a way that the user is located within sight or hearing range of the floor processing device. In this embodiment, the message of the floor processing device is dropped if no presence of a user can be detected. In particular, for example, so-called "geofencing" can be used to determine whether a mobile terminal of the user is located in the environment of the floor processing device. Based upon the presence of the external terminal of the user, for example his or her personal mobile phone, it can be inferred that the user is currently in the environment, specifically in the home or on the same level. In addition, however, the computing device of the floor processing device can also use the detection signals of the obstacle detection device to determine whether a moving object is located within the environment. Based upon the movement or possibly even the speed of movement, it can be determined whether the "object" involves a person.

An advantageous embodiment proposes that the computing device of the floor processing device be set up to plan a movement of the floor processing device in advance. In particular, one or several movements can be planned by generating an action plan, which has time and/or place guidelines for performing floor processing activities by the floor processing device. The action plan can preferably have time information for floor processing activities on the one hand, and also time information for switching between two different levels of the environment on the other. If a level change is not possible, since no user who can transport the floor processing device to a new transition location is in the environment at the time, a memory of the floor processing device preferably stores other floor processing activities, in particular prioritized in relation to a sequence, which the floor processing device carries out instead of performing corresponding floor processing activities on a new level of the environment. The times or time windows for a level change are preferably established independently of times or time windows for floor processing activities. The floor processing device can further also message a transport requirement while performing a floor processing activity. Alternatively, the message to the user can also stem from an idle or standby mode of the floor processing device.

Finally, it can be provided that, once the floor processing device has been localized at the defined transition location, the computing device be designed to transmit a control command to the drive unit, which causes the floor processing device to begin a floor processing activity right away or at a defined time, or travel to a base station marked in the area map. As soon as the floor processing device has thus recognized that it is at the defined transition location, the computing device advantageously controls the additional activities, in particular floor processing activities, of the floor processing device on the new level within which the defined transition location is. The activities defined in advance can provide that the floor processing device initially travel to a base station located on the level of the transition location, and there wait for a predefined starting time for a floor processing activity. If no base station is present, the floor processing device can also perform a floor processing activity immediately or with a time delay. If the floor processing activity is directly pending with the switch to the other level, the floor processing device preferably starts execution immediately.

BRIEF DESCRIPTION OF THE DRAWINGS

Other objects and features of the invention will become apparent from the following detailed description considered in connection with the accompanying drawings. It is to be understood, however, that the drawings are designed as an illustration only and not as a definition of the limits of the invention.

In the drawings,

FIG. 1 is a floor processing device according to the invention;

FIG. 2 is an environment of the floor processing device with several levels;

DETAILED DESCRIPTION OF PREFERRED EMBODIMENTS

Figure 3:
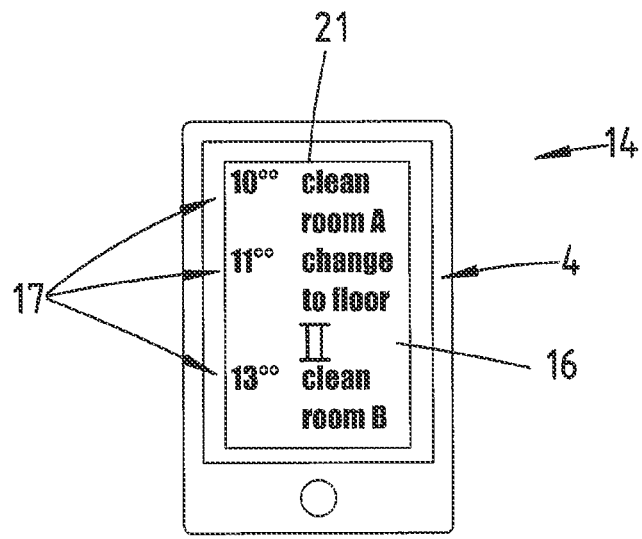
FIG. 3 is an external terminal that has a communications link with the floor processing device and displays an action plan for the floor processing device.

FIG. 1 shows a self-propelled floor processing device 1, which is here exemplarily designed as an autonomous cleaning robot. The floor processing device 1 has wheels 19 driven by a drive unit 2, as well as a cleaning element 20, e.g., which is here a likewise rotationally driven cleaning roller, which rotates around an essentially horizontal axis. In order to be able to detect obstacles 6, 7 in the environment of the floor processing device 1, the floor processing device 1 has an obstacle detection device 5, here for example in the form of an optical distance sensor, in particular designed as a 360 degree triangulation system that can detect obstacles 6, 7 all around the floor processing device 1. The obstacles 6, 7 can involve room boundaries of rooms within a building, or also furniture, decorative items, stair treads or the like. A computing device 8 of the floor processing device 1 evaluates the data detected by the obstacle detection device 5, and generates an area map 9 out of them, which essentially corresponds to a layout of the environment. Based upon this area map 9, the computing device 8 can orient itself for the self-localization and navigation of the floor processing device 1 within the environment. In addition, the floor processing device 1 has a communications interface 3 for transmitting the information to a user of the floor processing device 1. The communications interface 3 can directly activate a voice output or optical signal output on the one hand, or transmit information data to an external terminal 14 of the user in data communication with the communications interface 3 on the other. For example, the external terminal 14 can involve a mobile phone, a laptop computer, a tablet, or the like. On the other hand, the user can transmit information or control commands to the communications interface 3 of the floor processing device 1 by means of the external terminal 14. For example, the user can utilize the external terminal 14 to generate an action plan 16 for the floor processing device 1, wherein this action plan 16 has guidelines 17 relating to planned time and/or place floor processing activities. This and other information 4 from the floor processing device 1 or for the floor processing device 1 can be shown as information 4 on a display 21 of the external terminal 14.

FIG. 2 shows an exemplary environment of the floor processing device 1, specifically in the form of an area map 9, which contains a layout with two different partial environmental areas 10, 11 of a building. The first partial environmental area 10 involves a first level of the building. The second partial environmental area 11 is correspondingly a second, higher level of the building. The two partial environmental areas 10, 11 are connected with each other by a staircase 22. The partial environmental areas 10, 11 are logically linked with each other with the help of transition points 12 for integration into one and the same area map 9. Linking is such that the computing device 8 identifies and correlates the transition point 12 of the first partial environmental area 10 as an adjacent location of the corresponding transition point 12 of the second partial environmental area 11, so as to orient the floor processing device 1 in the area map 9 formed out of both partial environmental areas 10, 11. Further defined in each partial environmental area 10, 11 is a transition location 13, which here corresponds to a wait position 15 for the floor processing device 1. The importance of the transition location 13 and wait position 15 will be discussed in the following. Both the transition locations 13 and the wait positions 15 can preferably be defined by the user of the floor processing device 1 in the area map 9, for example by way of an entry via the external terminal 14. Also marked on the area map 9 is a current position of the floor processing device 1. For example, the floor processing device 1 on FIG. 2 is situated at the transition location 13 of the first partial environmental area 10, which is simultaneously defined as the wait position 15 for the floor processing device 1. For example, to allow the floor processing device 1 to recharge an accumulator, a base station 18 is located in the environment, here for example in a room of the second partial environmental area 11. Additional base stations 18 can also be located within the environment, for example one respective base station 18 per partial environmental area 10, 11.

Figure 4:
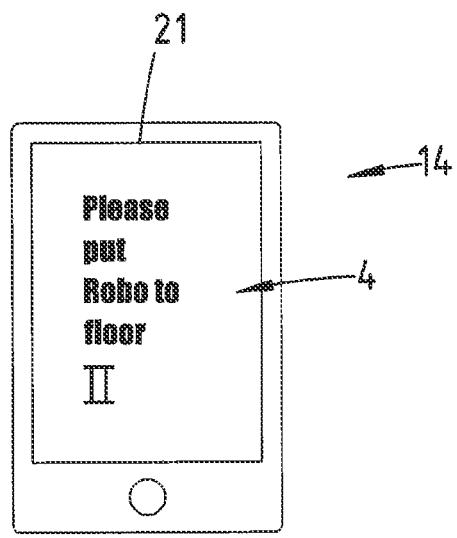
FIG. 4 is the external terminal when sending a transport requirement message to a user.

FIGS. 3 and 4 exemplarily show an external terminal 14, which is designed to communicate with the floor processing device 1. The external terminal 14 has an application installed on it which can be used to exchange information 4 between the floor processing device 1 and the user, and show it on a display 21.

FIG. 3 exemplarily shows an action plan 16 for the floor processing device 1. The action plan 16 comprises several actions of the floor processing device 1 as guidelines. The guidelines 17 each contain a definition of a time and location for performing an activity. For example, the guidelines 17 here involve planned floor processing activities, such as "clean room A" at 10 a.m., and "clean room B" at 1 p.m. In between those is a guideline 17 that prescribes a "change to floor II" for the floor processing device 1. A time window can be defined for the change to floor II, here specifically for example the second partial environmental area 11, within which the change must take place. The defined maximum timespan for the change within which a change is possible here measures two hours, specifically from 11 a.m. to 1 p.m. If a change does not take place within this time window, execution of the action plan 16 is terminated. For example, a user can then be informed that the action plan 16 has ended.

FIG. 4 shows a prompt to the user to carry the floor processing device 1 to floor II, so that the floor processing device 1 can get from the first partial environmental area 10 to the second partial environmental area 11 for executing the action plan 16, specifically by the user overcoming the staircase 22.

According to one of several possible exemplary embodiments, the invention now functions in such a way that the floor processing device 1 initially detects obstacles 6, 7 in each of the partial environmental areas 10, 11. A separate partial area map can then initially be generated for each of the partial environmental areas 10, 11. The user then brings the partial environmental areas 10, 11 for generating the area map 9 into a logical sequence, so as to achieve a sequence in relation to the elevation of the respective partial environmental area 10, 11. The user here also defines the transition points 12 between the partial environmental areas 10, 11, which the computing device 8 uses for logically integrating the two partial environmental areas 10, 11 into the same area map 9. Preferably in the area of the transition points 12, the user further defines wait positions 15, at which the floor processing device 1 can assume a defined wait position, so as to wait until the user carries the floor processing device 1 from the first partial environmental area 10 into the second partial environmental area 11 or vice versa. The wait position 15 is preferably not located directly in a passageway of the user, but rather leaves access to the staircase 22 open, so that the user does not trip over the floor processing device 1 or step in front of it. In addition, a transition location 13 can also be defined, in which the user usually puts down the floor processing device 1. Such a transition location 13 can likewise be defined in both partial environmental areas 10, 11. In particular, this transition location 13 can coincide with the wait position 15. Alternatively, however, the wait position 15 and the transition location 13 can also involve different locations of the respective floor. For example, a transition location 13 at which the user places the floor processing device 1 on a new floor can also lie at the base station 18 (or some other location).

Proceeding from its initial location in the first partial environmental area 10, specifically the lower floor of the building, the floor processing device 1 initially carries out guidelines 17 of the action plan 16, for example here specifically the cleaning of a room, which is planned for 10 a.m. After this room has been cleaned, the computing device 8 of the floor processing device 1 retrieves the information that the floor processing device 1 is to change to floor II at 11 a.m., specifically to the higher second partial environmental area 11. Since the floor processing device 1 cannot automatically move from the first partial environmental area 10 into the second partial environmental area 11, because the staircase 22 must for this purpose be overcome, the communication interface 3 of the floor processing device 1 sends a prompt to the user to carry the floor processing device 1 to floor II. To this end, the information 4 depicted on FIG. 4 appears on the display 21 of the external terminal 14 of the user at 11 a.m. (or also at some time before that), specifically the prompt "Please carry Robo to floor II". Alternatively, the information 4 about the required transport can be transmitted to the user by E-mail, or by voice output or optical signal output via the communication interface 3. So that the user can easily find the floor processing device 1 for transport, the floor processing device 1 was moved by the drive unit 2 to the defined wait position 15 known to the user, specifically into the area before the stairway. Because the floor processing device 1 is present at the wait position 15, the user further recognizes that the floor processing device 1 is to be carried to the second partial environmental area 11. According to an alternative embodiment, it would also be possible for the display of information 4 on the external terminal 14 of the user to be entirely omitted, and for the floor processing device 1 to show the manual transport requirement by virtue of being located at the wait position 15. If the user then happens to come along, he or she can carry the floor processing device 1 to the respective other partial environmental area 10, 11.

After the user has carried the floor processing device 1 into the new partial environmental area 11, here specifically the higher second partial environmental area 11, it can further execute the preplanned action plan 16. The user preferably drops the floor processing device 1 off at the transition location 13 of the second partial environmental area 11 provided for this purpose, so that the computing device 8 can directly continue navigation based on the area map 9, and need not first localize itself within the area map 9. The floor processing device 1 can then perform the next cleaning task, or here wait until the next guideline 17 at 1 p.m., for example, and then execute the floor processing activity "clean room B". If no further guideline 17 is open in the action plan 16, the floor processing device 1 can travel to the base station 1, for example, and there wait for a further use or control command by the user.

According to another alternative embodiment, the transition locations 13 in the partial environmental areas 10, 11 can be defined by virtue of the user dropping the floor processing device 1 off at a specific location of the respective floor, and thereby automatically defining this location as the transition location 13. In this case, the floor processing device 1 localizes itself within the area map 9. In order to transport the floor processing device 1 between the partial environmental areas 10, 11, the user or also the manufacturer can set a wait time at the factory for which the floor processing device 1 remains at the wait position 15 and waits for the user to carry the floor processing device 1 into the desired partial environmental area 10, 11. This wait time defines a maximum timespan starting at the time at which the floor processing device 1 assumes the wait position 15. For example, this defined maximum timespan can last for one or several hours. The maximum timespan preferably corresponds to a usual maximum timespan for which the user is absent. It can also be provided that the user define specific periods of time in which (exclusively) a change can take place between the partial environmental areas 10, 11. For example, this prevents a situation in which the floor processing device 1 waits in vain to be transported by the user. For example, such a timespan can be defined as times where the user is present between 5 p.m. and 9 p.m. The time periods defined for a floor change can be defined independently of the other planned cleaning tasks of the action plan 16.

According to another, especially preferred embodiment, the display of a manual transport requirement can depend on the presence of the user actually being detected in the environment of the floor processing device 1. This configuration makes it possible to preclude the user from receiving prompts to transport the floor processing device 1, even though he or she is not even in proximity to the floor processing device 1 at the time, and thus not even able to carry the floor processing device 1 from one partial environmental area 10, 11 to another partial environmental area 11, 10. For example, the presence of the user can be determined by means of geofencing, in which the external terminal 14 of the user is detected in the environment of the floor processing device 1. Alternatively, the obstacle detection unit 5 of the floor processing device 1 can detect a moving object in proximity to the floor processing device 1, and accept it as the user. As soon as the presence of the user is suspected in this way, information about a transport requirement can be transmitted from the communication interface 3 of the floor processing device 1 to the user.

Although only a few embodiments of the present invention have been shown and described, it is to be understood that many changes and modifications may be made thereunto without departing from the spirit and scope of the invention.

REFERENCE LIST

1 Floor processing device
2 Drive unit
3 Communication interface
4 Information
5 Obstacle detection unit
6 Obstacle
7 Transition obstacle
8 Computing device
9 Area map
10 Partial environmental area
11 Partial environmental area
12 Transition point
13 Transition location
14 External terminal
15 Wait position
16 Action plan
17 Guideline
18 Base station
19 Wheel
20 Cleaning element
21 Display
22 Staircase

What is claimed is:

1. A self-propelled floor processing device (1) comprising:
a drive unit (2) configured for moving the floor processing device (1) within an environment,
a communication interface (3) configured for outputting information (4) to a user of the floor processing device (1),
an obstacle detection unit (5) configured for detecting obstacles (6, 7) within the environment and
a computing device (8), which is set up to generate an area map (9) based upon the obstacles (6) detected by the obstacle detection unit (5), localize the floor processing device (1) using the area map (9), and transmit control commands to the drive unit (2) and the communication interface (3), wherein the computing device (8) is further set up to define at least one obstacle (6) within the area map (9) that cannot be independently overcome by the floor processing device (1) as a transition obstacle (7), identify the transition obstacle (7) during a movement through the environment based upon a comparison of currently detected obstacles (6) with the transition obstacle (7) stored in the area map, and report a manual transport requirement to the user by means of the communication interface (3) upon reaching the transition obstacle (7), wherein the area map (9) has several partial environmental areas (10, 11) that belong to different floor levels or elevation levels of a building, wherein the partial environmental areas (10, 11) are logically interconnected by defined transition points (12), wherein the linking is such that the computing device (8) identifies the transition point (12) of a first one of the partial environmental area (10) as an adjacent location of the corresponding transition point (12) of a second one of the partial environmental areas (11), so as to orient the floor processing device (1) in the area map (9) formed out of both partial environmental areas (10, 11) and wherein the transport requirement encompasses a request to the user to carry the floor processing device (1) to a defined transition location of the environment, the defined transition location being a defined location of the relevant floor level or elevation level.

2. The floor processing device (1) according to claim 1, wherein the transition obstacle (7) is a step or a staircase.

3. The floor processing device (1) according to claim 1, wherein the communication interface (3) is designed to output the transport requirement as a voice signal, a light signal, or as a communication to an external terminal (14) of the user having a communications link with the communication interface (3) of the floor processing device.

4. The floor processing device (1) according to claim 3, wherein, once the floor processing device (1) has been localized at the defined transition location (13), the computing device (8) is designed to transmit a control command to the drive unit (2), which causes the floor processing device (1) to begin a floor processing activity right away or at a defined time, or travel to a base station (18) marked in the area map (9).

5. The floor processing device (1) according to claim 1, wherein the area map (9) defines at least one wait position (15), at which the floor processing device (1) waits for the user after the transport requirement was determined and a message sent to the user.

6. The floor processing device (1) according to claim 5, wherein the computing device (8) is designed to end a waiting by the floor processing device (1) at the wait position (15) if a time that exceeds a defined maximum timespan has elapsed since the wait began.

7. The floor processing device (1) according to claim 1, wherein the obstacle detection device (5) is designed to detect a presence of the user in the environment of the floor processing device (1) and report it to the computing device (8), wherein the computing device (8) is designed to thereupon report the manual transport requirement to the user.

8. The floor processing device (1) according to claim 1, wherein the computing device (8) is set up to plan a movement of the floor processing device (1) in advance, in particular by generating an action plan (16), which has time and/or place guidelines (17) for performing floor processing activities by the floor processing device (1).

* * * * *